US012567788B2

(12) United States Patent
Holzleitner

(10) Patent No.: US 12,567,788 B2
(45) Date of Patent: Mar. 3, 2026

(54) TRANSPORT DEVICE

(71) Applicant: B&R INDUSTRIAL AUTOMATION GMBH, Eggelsberg (AT)

(72) Inventor: Alois Holzleitner, Braunau am Inn (AT)

(73) Assignee: ABB SCHWEIZ AG, Baden (CH)

( * ) Notice: Subject to any disclaimer, the term of this patent is extended or adjusted under 35 U.S.C. 154(b) by 740 days.

(21) Appl. No.: 17/614,408

(22) PCT Filed: May 28, 2020

(86) PCT No.: PCT/EP2020/064883
§ 371 (c)(1),
(2) Date: Nov. 26, 2021

(87) PCT Pub. No.: WO2020/239933
PCT Pub. Date: Dec. 3, 2020

(65) Prior Publication Data
US 2022/0239212 A1     Jul. 28, 2022

(30) Foreign Application Priority Data

May 28, 2019   (AT) .............................. A 50489/2019

(51) Int. Cl.
*H02K 41/03* (2006.01)
*B65G 54/02* (2006.01)

(52) U.S. Cl.
CPC .......... *H02K 41/031* (2013.01); *B65G 54/02* (2013.01); *H02K 2201/18* (2013.01); *H02K 2213/03* (2013.01)

(58) Field of Classification Search
CPC ............. H02K 41/031; H02K 2201/18; H02K 2213/03; B65G 54/02
(Continued)

(56) References Cited

U.S. PATENT DOCUMENTS 9,202,719 B2    12/2015 Lu et al.
9,633,878 B1     4/2017 Krishnan
(Continued)

FOREIGN PATENT DOCUMENTS

CA       2 956 087       1/2016
CN      105531077        4/2016
(Continued)

OTHER PUBLICATIONS

Rueprich (DE 102005009336 A1) Operating System For Sealing Jaws In Packing Machines Using Tubular Film Comprise Planar Drive With Sliders Mounted On Parallel Tables, Jaws Being Mounted On Sliders And Positioned Between Tables (Year: 2006).*
(Continued)

*Primary Examiner* — Jorge L Carrasquillo
(74) *Attorney, Agent, or Firm* — GREENBLUM & BERNSTEIN, P.L.C.

(57) ABSTRACT

In order to provide a transport device that includes a planar motor, which gives greater flexibility in the movement of the transport units, at least two planar motors have opposing transport planes, wherein provided on the transport plane of a first planar motor is at least one first transport unit, which is connected, by a connecting unit, to at least one second transport unit provided on the transport plane of a second planar motor.

16 Claims, 5 Drawing Sheets

Figure 1A:
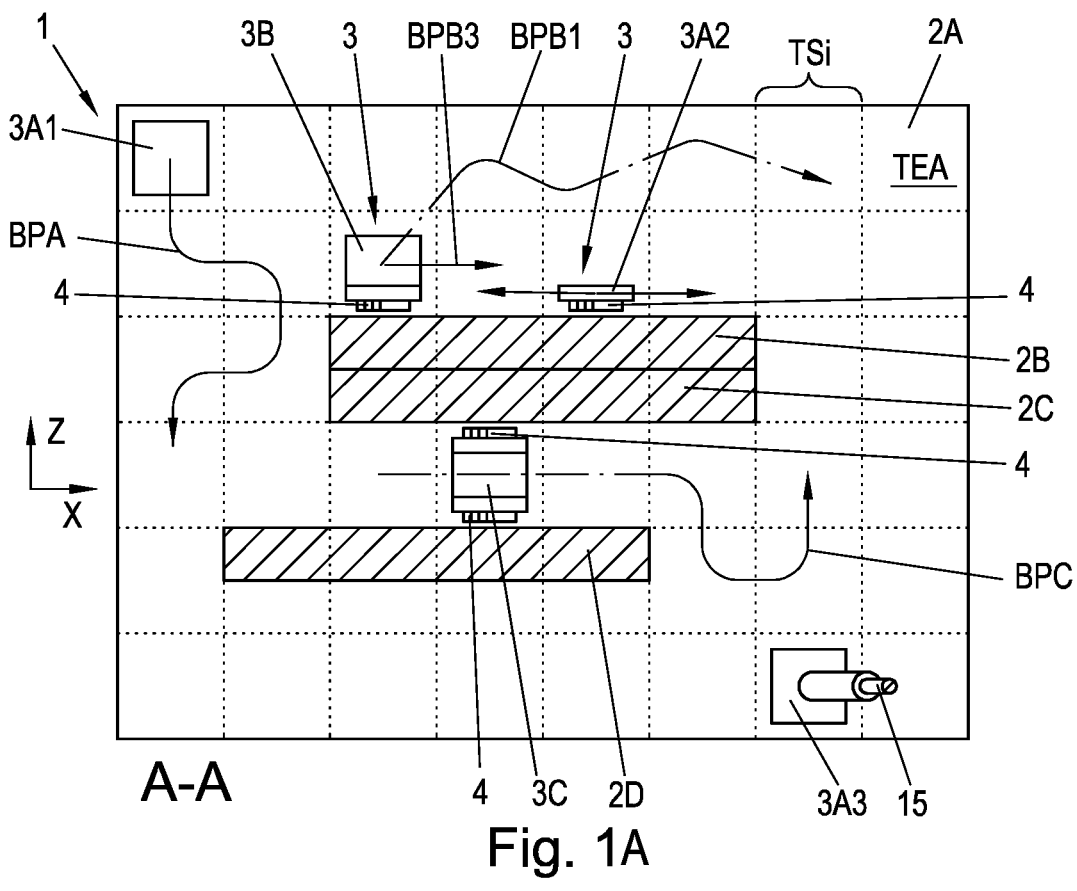

(58) Field of Classification Search
USPC ........................................................ 318/135
See application file for complete search history.

(56) References Cited

U.S. PATENT DOCUMENTS

| | | | | |
|---|---|---|---|---|
| 9,772,012 | B2 * | 9/2017 | Takanami | F16H 21/46 |
| 10,734,265 | B2 | 8/2020 | Janakiraman et al. | |
| 2017/0225911 | A1 | 8/2017 | Baechle et al. | |
| 2019/0348898 | A1 | 11/2019 | Frangen | |
| 2020/0030995 | A1 | 1/2020 | Lu et al. | |
| 2020/0180872 | A1 * | 6/2020 | Davidson | B65G 54/02 |

FOREIGN PATENT DOCUMENTS

| | | |
|---|---|---|
| CN | 105826218 | 8/2016 |
| DE | 195 31 520 | 1/1997 |
| DE | 10 2005 009 336 | 9/2006 |
| DE | 10 2014 214 693 | 1/2016 |
| DE | 10 2016 224 951 | 6/2018 |
| EP | 3 172 134 | 8/2018 |
| EP | 3 172 156 | 12/2018 |
| JP | 2016-160040 | 9/2016 |
| JP | 2017-520493 | 7/2017 |
| JP | 2018-504784 | 2/2018 |
| WO | 01/59409 | 8/2001 |
| WO | 2016/012171 | 1/2016 |
| WO | 2018/176137 | 10/2018 |

OTHER PUBLICATIONS

Lu et al. (WO 2018176137 A1)Robotic Devices and Methods for Fabrication, Use and Control of Same (Year: 2018).*
Wanner et al. (EP 3172156 B1) Apparatus for Transfering and/or Grouping (Year: 2018).*
Tecnotion, "Iron Core Linear motor manual", XP055727551, Retrieved from the Internet: https://www.tecnotion.com/downloads/iron-core-motors-manual.pdf , May 1, 2015, pp. 13-14.
Int'l Search Report (Form PCT/ISA/210) conducted in Int'l Appln. No. PCT/EP2020/064883 (Sep. 14, 2020).
Int'l Written Opinion (Form PCT/ISA/237) conducted in Int'l Appln. No. PCT/EP2020/064883 (Sep. 14, 2020).
Europe Office Action conducted in counterpart Europe Appln. 20 730 405.6-1017 (Feb. 20, 2024).
China Office Action conducted in counterpart China Appln. 2020800384490 (Feb. 14, 2023).
Japan Office Action conducted in counterpart Japan Appln. 2021-570133 (Apr. 25, 2024).

* cited by examiner

A-A

TRANSPORT DEVICE

The invention relates to a transport device comprising at least two planar motors, each forming a transport plane in which at least one transport unit is movable two-dimensionally, drive coils being provided on each planar motor in order to interact electromagnetically with drive magnets of a transport unit in order to move the transport unit within the corresponding transport plane. The invention further relates to a transport unit for a transport device having at least two planar motors comprising opposing transport planes and a method for operating a transport device.

Planar motors are well known in the prior art. For example, U.S. Pat. No. 9,202,719 B2 discloses the basic design and mode of operation of such a planar motor. A planar motor essentially has a transport plane in which one or more transport units are two-dimensionally movable. Drive coils, which are controlled by a control unit in order to generate a moving magnetic field in the desired direction of movement and are distributed in the transport plane, are usually provided on the planar motor for this purpose. Drive magnets (permanent magnets or electromagnets) are arranged distributed two-dimensionally on the transport unit and interact with the magnetic field, so that a driving force is exerted on the transport unit in the desired direction of movement. The drive coils and the drive magnets are advantageously arranged in such a way that, in addition to a one-dimensional movement along the axes spanned by the transport plane, more complex two-dimensional movements of the transport unit in the transport plane are also possible. A planar motor can be used, for example, as a transport device in a production process, very flexible transport processes with complex movement profiles being implementable.

Such applications of a planar motor as a transport device are shown, for example, in EP 3 172 156 B1 and EP 3 172 134 B1. For example, two planar motors are arranged adjacent to one another, and transport units are movable on the two planar motors. This allows transport units to move independently of one another in two planes. In another embodiment, a planar motor and one or more continuous conveyors interact in order to manipulate products in a certain way. The transport units of the planar motor are each individually movable two-dimensionally within a vertical plane. The planar motor allows a very flexible movement within the vertical plane, but flexibility is limited by the continuous conveyor.

WO 2018/176137 A1 discloses a transport device with two spaced parallel planar motor stators, each of which forms a transport plane in which a transport unit is movable. The transport units are connected in an articulated manner to a connecting body on which an object can be transported. By relative movement of the transport units, the object is movable in the normal direction to the transport planes. DE 195 31 520 A1 discloses a similar transport device, the transport units being movable in the same transport plane.

Further transport devices in the form of planar motors are disclosed in DE 10 2016 224 951 A1, WO 01/59409 A2, and WO 2016/012171 A1.

It is therefore an object of the invention to specify a transport device having a plurality of planar motors which allows a more flexible transport process.

According to the invention, the object is achieved in that the transport planes of the at least two planar motors face each other, at least one first transport unit being provided in the transport plane of a first planar motor that is connected by means of a connecting unit to at least one second transport unit provided in the transport plane of a second planar motor. The connected transport units allow very flexible and complex movement sequences, for example a movement profile of a point on the connecting unit is composed of the overlapping movement profiles of the transport units in the corresponding transport plane.

Preferably, an arrangement angle is provided between the opposing transport planes that is a maximum of 45°, the arrangement angle preferably being 0°, by the transport planes being arranged opposite and parallel to one another.

The connecting unit is advantageously adjustable in order to adapt a connecting unit length during the movement of the at least two transport units to a variable distance between the at least two transport units. This creates a greater degree of freedom in the movement of the connected transport units.

At least one receiving unit for receiving an object is preferably provided on the connecting unit. As a result, depending on the structural design of the connecting unit, various objects can be received and transported in a simple manner.

According to a further advantageous embodiment, it is provided that two planar motors are provided with adjoining transport planes that are inclined to one another at an angle of abutment, at least one multi-acting transport unit being provided, at least first drive magnets being provided on the multi-acting transport unit in order to interact electromagnetically with the drive coils of a first planar motor and at least second drive magnets being provided to interact electromagnetically with the drive coils of a second planar motor, and in that the multi-acting transport unit is two-dimensionally movable within the transport plane of one of the planar motors or likewise is one-dimensionally movable in the adjacent transport planes of the first and second planar motors. This allows very flexible and complex movement sequences; for example a multi-acting transport unit is movable in a conventional manner in only one of the adjacent transport planes. A multi-acting transport unit can, however, be moved one-dimensionally in both adjacent transport planes at the same time, for example in order to be able to generate a greater driving force. Furthermore, it is particularly advantageous that the multi-acting transport unit can also be transferred from one transport plane to an adjacent transport plane.

As a multi-acting transport unit, a double-acting transport unit is preferably provided on which is provided a base body with two legs, which are arranged at an angle to one another that corresponds to the angle of abutment between two adjacent transport planes, the first drive magnets being arranged on one leg and the second drive magnets being arranged on the other leg. This creates a stable transport unit.

It is particularly advantageous if the multi-acting transport unit can be decoupled into at least two single-acting transport units, at least one coupling device being provided on each of the at least two single-acting transport units in order to releasably couple the transport units to one another in order to form the multiple-acting transport unit. As a result, both the advantages of a single-acting transport unit and the advantages of a multi-acting transport unit can be used. In the case of the two-dimensional movement within one transport plane, the lower weight and the better weight distribution of the single-acting transport unit can be used. In the case of the one-dimensional movement in two adjacent transport planes, the single-acting transport units can be coupled again to form the multi-acting transport unit in order to use the greater driving force potential.

The angle of abutment between the two adjacent transport planes is advantageously between 30° and 150°, particularly preferably 90°. This allows a simple design, for example with orthogonal transport planes.

For each planar motor, at least one planar motor control unit is preferably provided to control the drive coils of the relevant planar motor, the planar motor control units of the at least two planar motors being connected in order to exchange control information for controlling transport units of the relevant planar motor and/or so that the planar motor control units are connected to a higher-level transport device control unit or integrated therein. This allows control commands between individual planar motors to be exchanged and synchronized in order to harmonize the movement profiles of the transport units.

At least one planar motor is preferably constructed from a plurality of adjacent transport segments which together form the transport plane of the planar motor, drive coils being provided on each transport segment. A modular design is thus possible, as a result of which planar motors with transport planes of different sizes can be created with a standardized transport segment.

Furthermore, the object is achieved with a transport unit in that the transport unit is connected by means of a connecting unit to at least one other transport unit which is movable within the other transport plane of the opposing transport planes.

The object is also achieved in that at least one transport unit which is moved within the transport plane of one of the planar motors is connected by means of a connecting unit to at least one transport unit which is moved within the transport plane of the at least one other planar motor, the drive coils of the planar motors being controlled by the corresponding planar motor control unit in order to interact with the drive magnets of the transport units to generate a propulsive force.

Figure 1B:
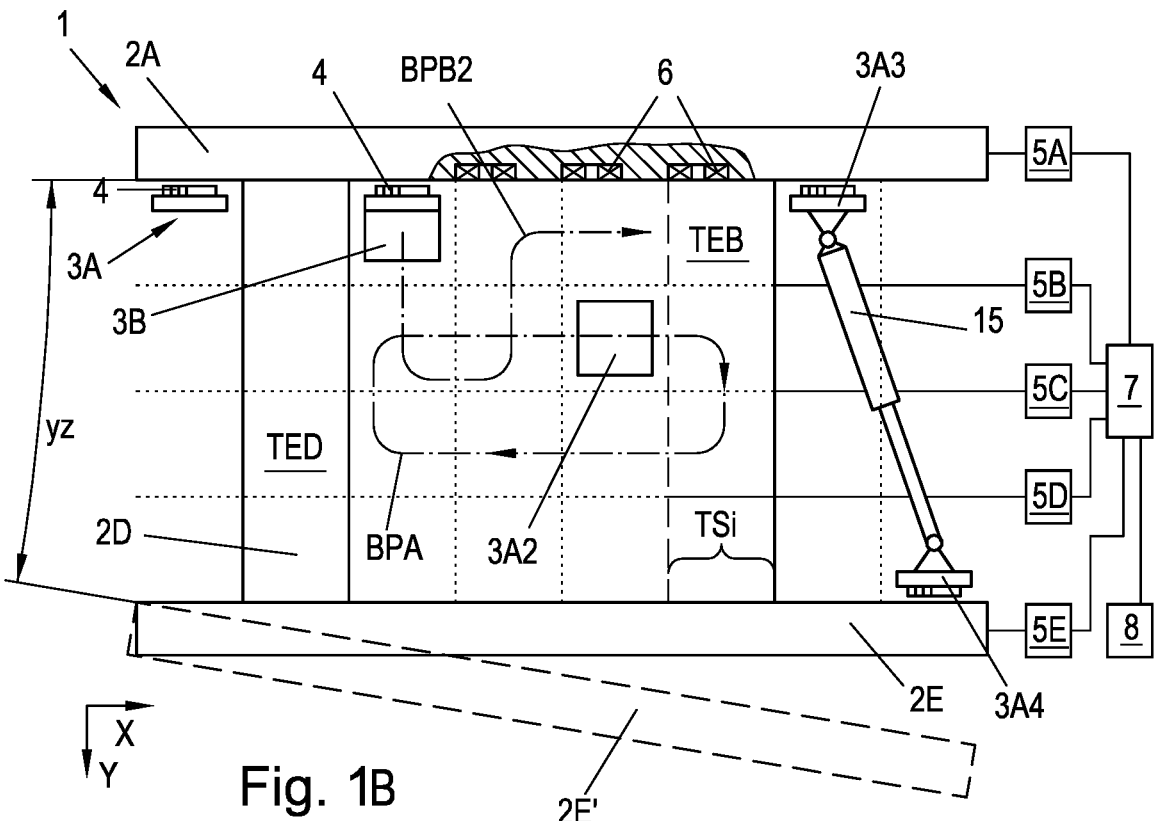
Figure 1C:
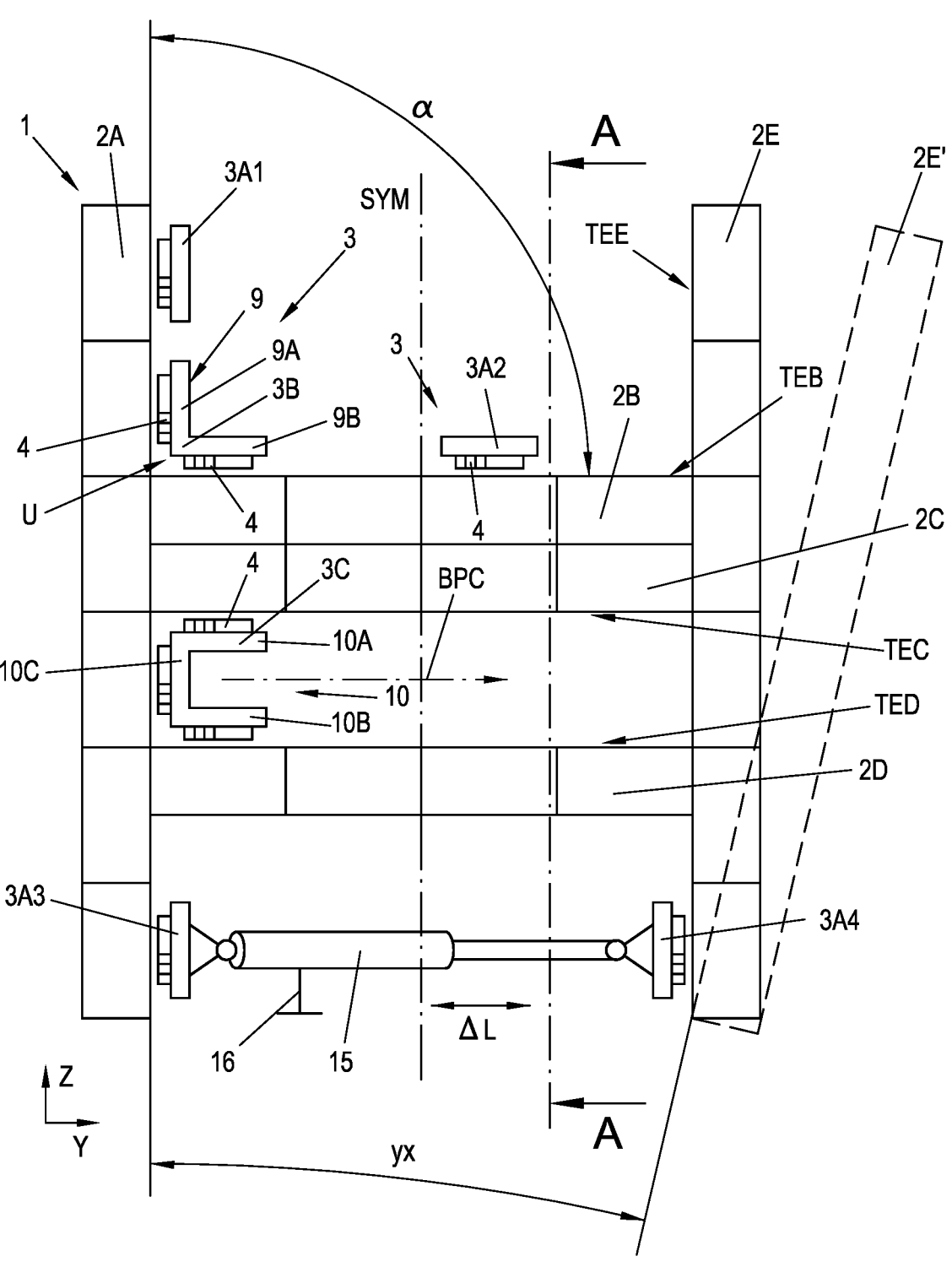
Figure 2:
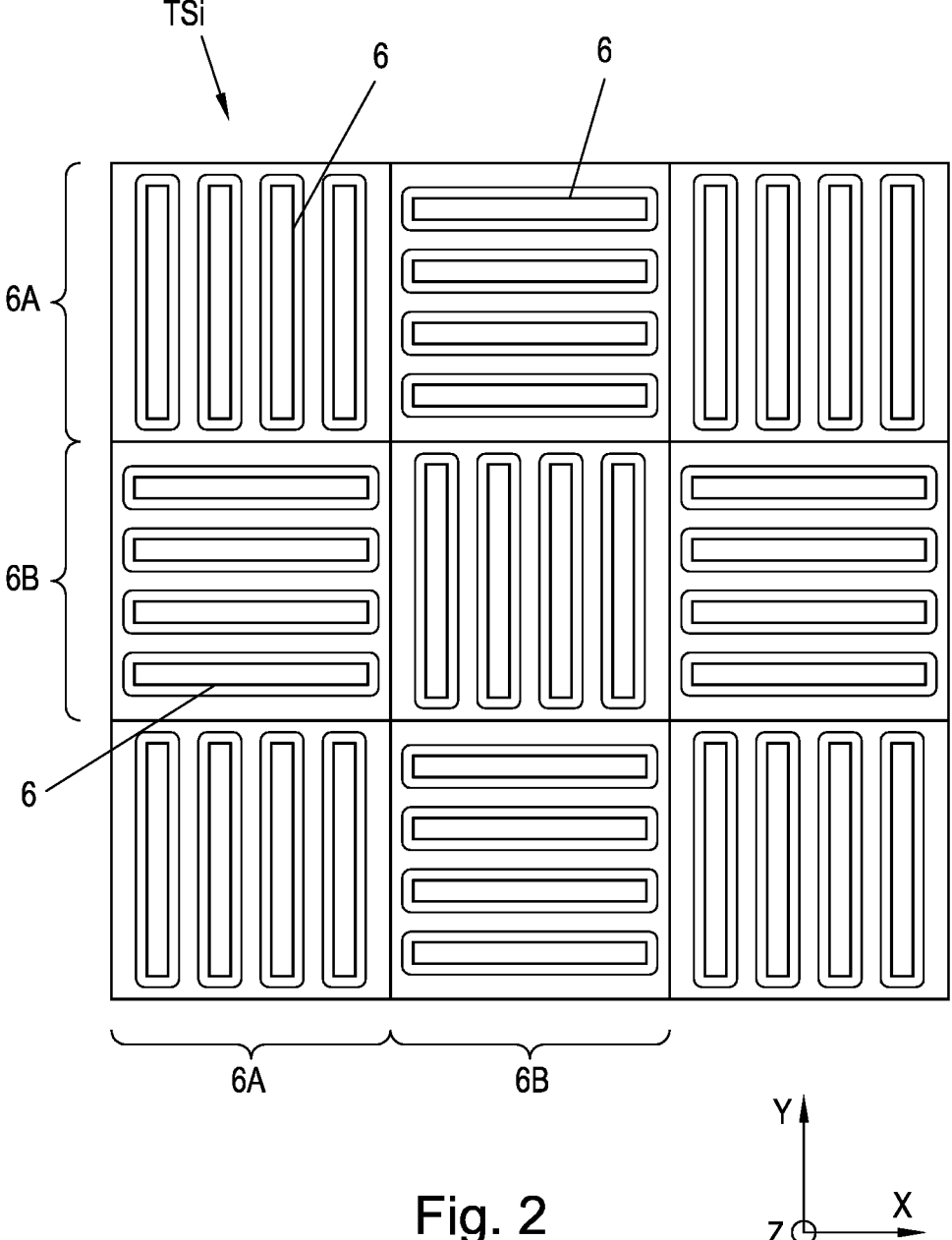
Figures 3A, 3B, 4:
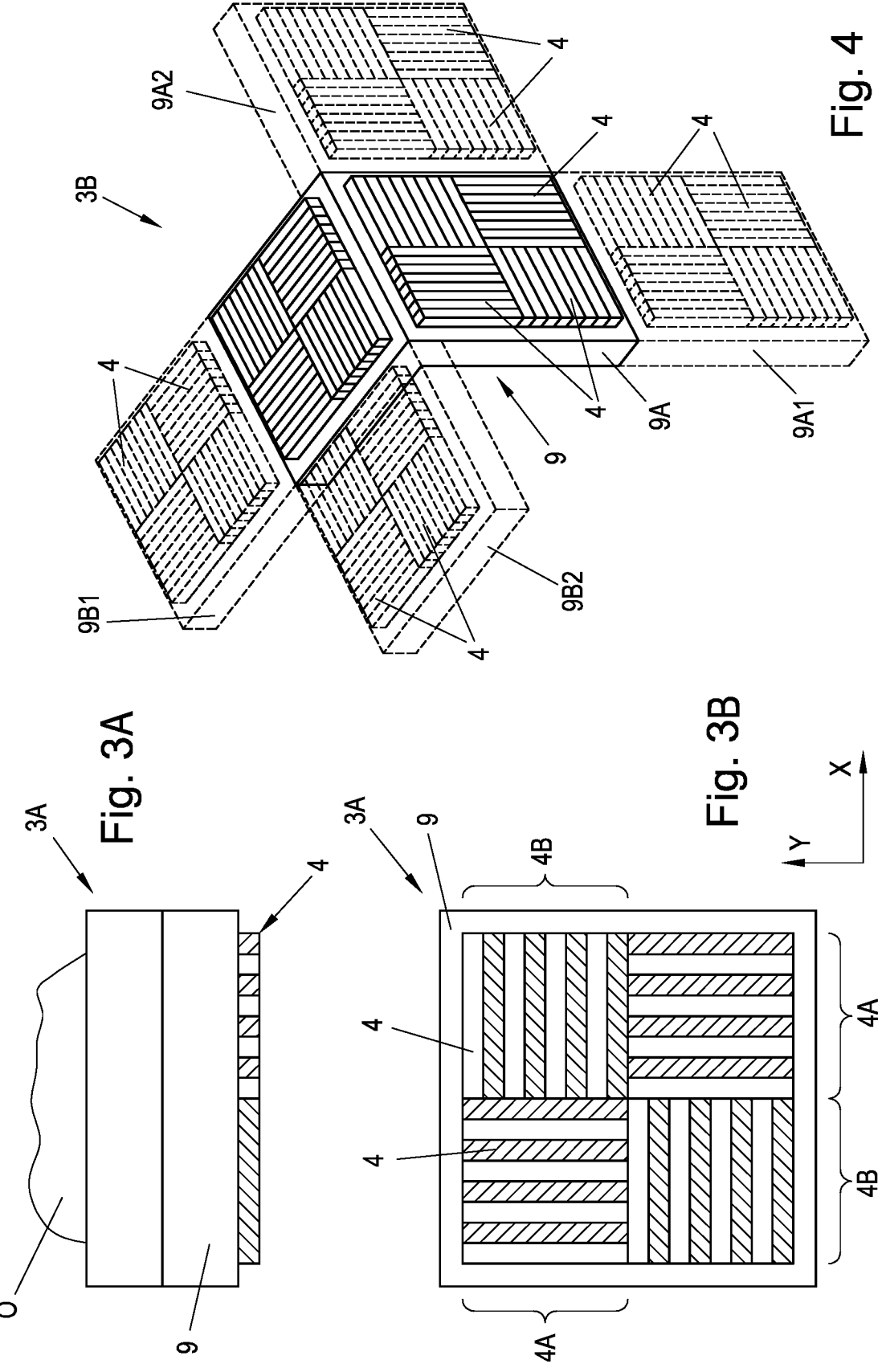
Figures 5, 6:
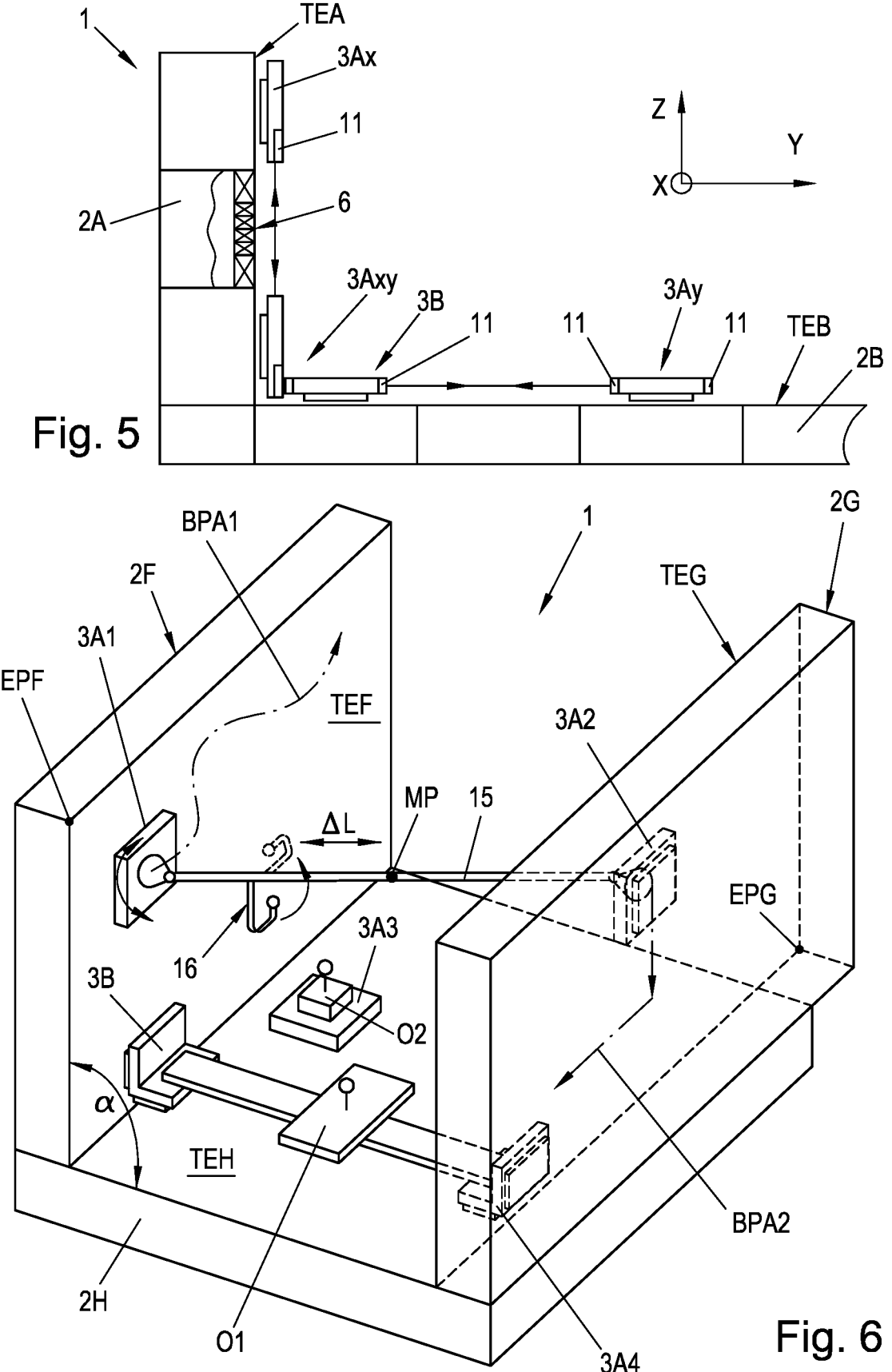

In the following, the present invention is described in greater detail with reference to FIGS. 1 to 6, which, by way of example, show schematic and non-limiting advantageous embodiments of the invention. In the drawings:

FIG. 1A-1C show an example of a transport device according to the invention in a front view, a plan view and in a side view, FIG. 2 shows an arrangement of drive coils on a transport segment of a planar motor, FIG. 3A shows a single-acting transport unit of a planar motor in a side view, FIG. 3B shows an arrangement of drive magnets on a single-acting transport unit, FIG. 4 shows a double-acting transport unit of a planar motor in an isometric view, FIG. 5 shows a coupling process of transport units depending on a side view of a transport device, FIG. 6 shows a further example of a transport device according to the invention having two transport units connected by means of a connecting unit.

In FIG. 1A an exemplary embodiment of a transport device 1 according to the invention is shown in a sectional view according to the section line A-A in FIG. 1C. A first planar motor 2A is provided in the transport device 1, which forms a first transport plane TEA. In the example shown, the first transport plane TEA is a vertical plane with a vertical axis Z and a longitudinal axis X. The first planar motor 2A is constructed from a plurality of transport segments TSi that adjoin one another in order to form the first transport plane TEA. As a result, a planar motor 2 can be constructed in a modular manner and transport planes TEi of different sizes can be implemented. Of course, this modular design is only optional and a planar motor 2 could also be formed by just a single assembly or a single transport segment TSi.

Transport units 3 are movable two-dimensionally within the first transport plane TEA of the first planar motor 2A. For example, a movement would only be possible in one axial direction along the vertical axis Z or the longitudinal axis X or a two-dimensional movement profile with a Z coordinate and an X coordinate in the first transport plane TEA, as indicated by the movement profile BPA of the transport unit 3A. For this purpose, drive coils 6, which are controlled by a control unit 5A, are provided on the first planar motor 2A. An electrical voltage can be applied to the drive coils 6 in order to generate a magnetic field. A substantially moving magnetic field can be generated by appropriate control of drive coils 6 arranged next to one another. The drive coils 6 are advantageously arranged on the first planar motor 2A in such a way that the magnetic field can extend in any direction in the first transport plane TEA in order to realize corresponding movement profiles of the transport units 3. The transport plane TEi is not to be understood here as a plane in the mathematical sense, but rather a flat transport surface which is delimited by the relevant planar motor 2 and on which the transport units 3 can move.

Drive magnets 4, for example permanent magnets, are arranged on each of the transport units 3, which interact with the drive coils 6 in order to exert a driving force on the transport unit 3. Depending on the activation of the drive coils 6, a moving magnetic field is thus generated which interacts with the drive magnets 4 in order to move the transport unit 3.

During operation, an air gap between the transport units 3 and the relevant planar motor 2 is provided between the drive coils 6 and drive magnets 4. In addition to the two-dimensional movement within the transport plane TEA (or generally TEi), a certain movement of the transport units 3 in the vertical direction, that is to say normal to the transport plane TEi, is also possible. By appropriately controlling the drive magnets 6, the air gap can be increased and decreased to a limited extent, as a result of which the transport unit 3 is movable in the vertical direction. The size of the available freedom of movement in the vertical direction depends essentially on the structural design of the transport device 1, in particular on the maximum magnetic field that can be generated by the drive coils 6 and the drive magnets 4, as well as the mass and load of the transport unit (e.g. on the weight of a transported object).

Depending on the size and design of the transport device 1, the available range of motion in the vertical direction can be, for example, in the range from a few mm to a few centimeters.

The transport units 3 can be held in any way on the planar motor 2 or on the transport plane TE, for example in order to maintain the air gap. Any suitable guide elements can be provided on the transport units 3 for this purpose.

The design and mode of operation of a planar motor are, however, basically known, for which reason no detailed description is given at this point. It is generally known that a planar motor 2 always has a stator as a fixed component and has at least one transport unit 3 as a movable component. As is known, the stator forms the transport plane TE, in which the at least one transport unit 3 is movable by electromagnetic interaction of the drive coils 6 and the drive magnets 4. The drive coils 6 are usually arranged on the stator and the drive magnets 4 are usually arranged on the transport unit 3. Of course, as is known, the reverse variant is also conceivable, with the drive coils 6 on the transport unit 3 and the drive magnets 4 on the stator. An exemplary arrangement of drive coils 6 on a transport segment TSi is shown in FIG. 2 and will be described in detail below. An exemplary arrangement of drive magnets 4 on a transport unit 3 is shown in FIGS. 3A+3B and FIG. 4.

Also provided in the transport device 1 is at least one second planar motor 2, which forms a transport plane TEi. According to the invention, at least two planar motors 2 with opposing transport planes TEi are provided in the transport device 1, at least one transport unit 3 being provided in the transport plane TEi of a planar motor 2, which transport unit is connected by means of a connecting unit 15 to at least one transport unit 3 provided in the transport plane TEi of the at least one other planar motor 2, the planar motor control units 5 being provided to control the drive coils 6 of the planar motors 2 in order to interact with drive magnets 4 of the transport units 3 to move the transport units 3 within the corresponding transport plane TEi.

Advantageously, the opposing transport planes TEi are also arranged at a distance from one another, so they preferably do not adjoin one another and do not intersect.

Preferably, an arrangement angle γ between the opposing transport planes TEi is provided which is a maximum of 45°, it being particularly advantageous if, by the opposing transport planes TEi being arranged opposite and parallel to one another, the arrangement angle γ=0°. In general, the arrangement angle γ is to be understood as the angle between the normal vectors of the corresponding opposing transport planes TEi.

In the example shown, two single-acting transport units 3A3, 3A4 are provided in the transport device 1, the single-acting transport unit 3A3 being movable in the transport plane TEA of the first planar motor 2A and the transport unit 3A4 being movable in the transport plane TEE of a fifth planar motor 2E. In the example shown, the fifth planar motor 2E is arranged relative to the first planar motor 2A such that the transport planes TEA, TEE face one another and are arranged parallel to one another, as shown in FIG. 1A-C; the arrangement angle γ is thus 0°. Of course, the transport planes TEA, TEE could also be inclined toward one another.

The planar motors 2A, 2E could, for example, also be arranged in such a way that the opposing transport planes TEA, TEE are inclined to one another at a maximum arrangement angle γ of 45°, as indicated by dashed lines in FIGS. 1B and 1C. The fifth planar motor 2E could, for example, be arranged relative to the first planar motor 2A such that the transport plane TEE of the fifth planar motor 2E' is inclined at an arrangement angle $\gamma_z$ with respect to the Z axis for the transport plane TEA of the first planar motor 2A (FIG. 1B) and/or is inclined at an arrangement angle $\gamma_x$ with respect to the X axis for the transport plane TEA of the first planar motor 2A (FIG. 1C). A rotation relative to one another about the Y-axis is not limited, because the arrangement angle γ between the transport planes TEA, TEE is not changed thereby. The connection unit 15 is designed here as an essentially rigid connecting rod which is connected in an articulated manner to both transport units 3A3, 3A4. The connecting unit 15 is preferably also designed to be adjustable in order to adapt a connecting unit length during the movement of the transport units 3A3, 3A4 to a variable distance between the at least two transport units 3A3, 3A4, as indicated in FIG. 1C by the length difference L. A receiving unit 16, for example, can also be provided on the connecting unit 15 in order to receive and transport an object (not shown). The receiving unit 16 is only indicated in FIG. 1C; the specific configuration depends of course on the application of the transport device 1 and is at the discretion of a person skilled in the art. The function of the connecting unit 15 is explained in greater detail below using the example in FIG. 6.

Of course, a rigid or flexible product that is connected to two or more transport units 3 could also be provided directly as the connecting unit 15. In this way, for example, flexible plastics film or textiles could be transported and/or, for example, tensioned or stretched by transport units 3. It would also be conceivable, for example, that ropes, cables, wires, etc. are provided as the connecting unit 15 and that they are twisted, for example, by the relative movement of the transport units 3.

Furthermore, it would be conceivable for a separate planar motor 2 to be provided as the connecting unit 15 between at least two transport units 3. The planar motor 2 could then be moved by the transport units 3 and, in turn, a transport unit 3 could be moved two-dimensionally on the transport plane TEi of the planar motor 2. Instead of a planar motor 2, however, a known long-stator linear motor could also be provided as the connecting unit 15. On a stator of the long-stator linear motor, a plurality of drive coils are generally arranged one behind the other in a direction of movement and can be energized in order to generate a moving magnetic field. A transport unit on which a plurality of drive magnets are arranged one behind the other is movable one-dimensionally along the stator in the direction of movement depending on the magnetic field generated by the drive coils. A continuous conveyor, such as a belt conveyor or a chain conveyor, could also be provided as the connecting unit 15. It can be seen from this that a connecting unit 15 could be used in a variety of designs, as a result of which a large number of different movement sequences is possible.

Further planar motors 2 can of course also be provided in the transport device 1, each of which forms a transport plane TEi in which one or more transport units 3 are movable two-dimensionally. In the example shown, a second planar motor 2B is provided which forms a second transport plane TEB, the transport planes TEA, TEB of the planar motors 2A, 2B adjoining one another and being inclined to one another at a certain angle of abutment a. The at least two planar motors 2A, 2B, of course, do not have to be designed as structurally separate units; they could instead also be implemented, for example, in the form of an integral unit on which the transport planes TEA, TEB are provided. Here the two transport planes TEA, TEB are normal to one another; the angle of abutment α is thus 90 degrees. Of course, a smaller or larger angle of abutment α would also be conceivable (in particular between 30° and 150°). Drive coils 6 (not shown) are provided on the second planar motor 2B in a manner analogous to the first planar motor 2A and are controlled by a planar motor control unit 5B in order to interact electromagnetically with drive magnets 4 of the transport units 3 in order to move the transport units 3 two-dimensionally within the second transport plane TEB.

Of course, further planar motors 2, in this case, for example, a third planar motor 2C and a fourth planar motor 2D, can also be provided. The transport planes TEC, TED of the third and fourth planar motor 2C, 2D likewise directly adjoin the transport plane TEA of the first planar motor 2A and are normal thereto. The third planar motor 2C here also directly adjoins the second planar motor 2B, so that parallel transport planes TEB, TEC facing away from one another result. The planar motors 2B, 2C, 2D are essentially identical here, with the same dimensions in the vertical, longitudinal and transverse directions Z, X, Y. However, the fourth planar motor 2D is arranged offset in the longitudinal direction X with respect to the second and third planar motors 2B, 2C. Of course, this is only an example and other desired configurations would also be possible. The fifth planar motor 2E is arranged in such a way that its transport plane TEE faces the transport plane TEA of the first planar motor 2A and is parallel thereto, as has already been described. This results in an essentially symmetrical transport device 1 with a plane of symmetry SYM (FIG. 1B). Like the first planar motor 2A, the other planar motors 2B, 2C, 2D, 2E are also constructed from a plurality of adjoining transport segments TSi, on each of which drive coils 6 are provided. As a result of the modular design, a transport device 1 with a plurality of planar motors 2, also with transport planes of different sizes in each case, can be implemented, for example, with just one type of transport segment TSi.

In the example shown, for each planar motor 2A-2E, a planar motor control unit 5A-5E is provided with which the drive coils 6 of the relevant planar motor 2A-2E can be controlled, as shown in FIG. 1B. The planar motor control units 5A-5E are connected to a higher-level transport device control unit 7 here. The planar motor control units 5A-5E could of course also be integrated into the higher-level transport device control unit 7. It can also be provided that a segment control unit is provided for each transport segment TSi, or group of transport segments TSi, and can also be integrated in a planar motor control unit 5A-5E. The transport device control unit 7 is in this case connected to a user interface 8, for example a computer, via which the transport unit 3 can be controlled. Via the transport device control unit 7, the movement profiles of transport units 3, which are moved on different planar motors 2A-2E, can be synchronized or coordinated with one another, for example to avoid a collision of transport units 3 or objects transported therewith. A control program that implements the desired movement profiles of the transport units 3 runs on each of the planar motor control units 5A-5E.

Various transport units 3 can be moved simultaneously and independently of one another on the transport device 1. In the example shown, a single-acting transport unit 3A1, 3A2 is provided on each of the first and second planar motors 2A, 2B. The single-acting transport units 3A1, 3A2 can thus be moved essentially as desired in the corresponding transport plane TEA, TEB. The single-acting transport unit 3A1 shown on the first planar motor 2A is movable, for example, according to the movement profile BPA with a coordinate in the vertical direction Z and a coordinate in the longitudinal direction X in the first transport plane TEA, as indicated in FIG. 1a. The single-acting transport unit 3A1 shown on the second planar motor 2A is movable, for example, within the second transport plane TEB with a coordinate in the transverse direction Y and a coordinate in the longitudinal direction X according to the movement profile BPA shown in FIG. 1B.

A single-acting transport unit 3A has drive magnets 4 only on one side, as shown by way of example in FIGS. 4a+4b. A single-acting transport unit 3A can therefore only be moved within one transport plane TEi by the drive magnets 4 of the single-acting transport unit 3A interacting with the drive coils 6 of the corresponding planar motor 2. A movement of a single-acting transport unit 3A, for example from the first transport plane TEA to the second transport plane TEB, is not possible. However, a single-acting transport unit 3A could of course be received manually, for example by a user or a manipulation device (e.g. crane or robot) from the transport plane TEi of a planar motor 2 and placed on the transport plane TEi of another planar motor 2 and further moved thereon.

A multi-acting transport unit 3B, 3C can also be provided in the transport device 1 and can either be moved two-dimensionally in the transport plane TEi of a planar motor 2 or likewise can be moved one-dimensionally in the adjacent transport planes TEi of at least two planar motors 2. At least first drive magnets 4, which are provided to interact electromagnetically with the drive coils 6 of a planar motor 2, and at least second drive magnets 4, which are provided to interact electromagnetically with the drive coils 6 of a planar motor 2 with adjacent transport plane TEi, are arranged on the multi-acting transport unit 3 B, 3C to interact electromagnetically.

In the example shown, a double-acting transport unit 3B is provided which has an essentially L-shaped base body 9. On one leg 9A of the L-shaped base body 9 of the transport unit 3B, first drive magnets 4 are provided which interact with the drive coils 6 of the first planar motor 2A. On the second leg 9B of the L-shaped base body, second drive magnets 4 are provided which interact with the drive coils 6 of the second planar motor 2B. The angle between the legs 9A, 9B of the L-shaped base body 9 essentially corresponds to the angle of abutment a between the first and second transport plane TEA, TEB, in this case, for example, 90 degrees.

The double-acting transport unit 3B in the example shown can now, for example, only be moved within the first transport plane TEA of the first planar motor 2A. For this purpose, the drive coils 6 of the first planar motor 2A are controlled accordingly by the planar motor control unit 5A (or the transport device control unit 7) in order to interact with the first drive magnets 4 on the first leg 9A of the double-acting transport unit 3B in order to generate a drive force.

The double-acting transport unit 3B could thus be moved within the first transport plane TEA, for example, according to the movement profile BPB1 with the coordinates Z, X. The double-acting transport unit 3B could, for example, also be moved only in the second transport plane TEB of the second planar motor 2B. For this purpose, the drive coils 6 of the second planar motor 2B are controlled accordingly by the planar motor control unit 5B (or the transport device control unit 7) in order to interact with the second drive magnets 4 on the second leg 9B of the double-acting transport unit 3B in order to generate a drive force. The double-acting transport unit 3B could thus be moved within the second transport plane TEB, for example, according to the movement profile BPB2 with the coordinates X, Y.

In a particularly advantageous manner, however, the double-acting transport unit 3B can likewise be moved one-dimensionally on the first transport plane TEA of the first planar motor 2A and the second transport plane TEB of the second planar motor 2B. For this purpose, the drive coils 6 of the first planar motor 2A and/or the drive coils 6 of the second planar motor 6 are controlled accordingly by the planar motor control unit 5A and/or the planar motor control unit 5B (or the transport device control unit 7) in order to interact with the first drive magnets 4 on the first leg 9A and/or with the drive magnets 4 on the second leg 9B of the double-acting transport unit 3B in order to generate a driving force. The double-acting transport unit 3B could thus be moved with the X coordinate according to the movement profile BPB3, for example. This essentially corresponds to a one-dimensional movement in the direction of the intersection of the two adjacent transport planes TEA, TEB. For example, when transporting heavy objects it can be advantageous if the drive coils 6 of both planar motors 2A, 2B are energized in order to generate a higher drive force on the double-acting transport unit 3B.

Advantageously, the region of the adjacent transport planes TEA, TEB can also be used as a transfer point U (see FIG. 1C) in order to move a double-acting (or multi-acting) transport unit 3B, for example from the transport plane TEA to the adjacent transport plane TEB. This allows relatively complex movement patterns to be implemented. For example, the double-acting transport unit 3B could first be moved within the second transport plane TEB of the second planar motor 2B in the transverse direction Y to the transfer point U (from right to left in FIG. 1C), the movement being controlled via the drive coils 6 of the second planar motor 2B. In the transfer point U, the double-acting transport unit 3B is advantageously stopped briefly, and the double-acting transport unit 3B can be moved from the transfer point U in the transport plane TEA of the first planar motor 2A, the movement being controlled via the drive coils 6 of the first planar motor 2A. From the transport plane TEA of the first planar motor 2A, the double-acting transport unit 3B could in turn be transferred to the transport plane TED of the fourth planar motor 2D, etc.

In principle, however, a transfer would also be possible without changing the direction of the double-acting transport unit 3B. For example, the double-acting transport unit 3B could be moved in the longitudinal direction X according to the movement profile BPB3, the drive being able to take place via the drive coils 6 of the second planar motor 2B and/or via the drive coils 6 of the first planar motor 2A. At the end of the second planar motor 2B in the longitudinal direction X, the first planar motor 2A could take over the drive and the double-acting transport unit 3B could be moved further in the longitudinal direction X and/or in the vertical direction Z by the drive coils 6 of the first planar motor 2A. In this case, there would be no need for a stoppage during the handoff.

In the example shown, a triple-acting transport unit 3C is also shown. The triple-acting transport unit 3C has an essentially U-shaped base body 10 with three legs 10A, 10B, 10C, on each of which drive magnets 4 are provided. With a correspondingly configured transport device 1 as in FIG. 1a-1C, a simultaneous drive by means of three planar motors 2A, 2C, 2D (or 2E, 2C, 2D, for example) would be possible. Of course, the triple-acting transport unit 3C could also only be moved within a single transport plane TEA-TEE.

Of course, a 4-acting, 6-acting or generally x-acting transport unit 3 (not shown) would also be conceivable which has drive magnets 4 on 4, 6, . . . x sides. The x-acting transport unit 3 could thus be moved one-dimensionally in x transport planes TEi at the same time or two-dimensionally in each of the x transport planes TEi. The number of sides on which drive magnets 4 are provided is advantageously made to correspond to the available planar motors 2 and their transport planes TEi which are arranged in relation to one another.

Of course, a multi-acting transport unit 3B, 3C could also be connected by means of a connecting unit 15 to another (multi- or single-acting) transport unit 3 which is movable within another transport plane TEi. For example, the illustrated double-acting transport unit 3B could be connected to a further (not shown) opposite double-acting transport unit 3B, which is movable in the transport plane TEB of the second planar motor 2B and/or in the transport plane TEE of the fifth planar motor 2E. In order to achieve as many degrees of freedom as possible in the movement, it is advantageous, on the one hand, if the connecting unit 15 is connected in an articulated manner to the relevant transport units 3. On the other hand, it is advantageous if the connecting unit 15 is designed to be adjustable in order to allow a change in length, for example if the connected transport units 3 move away from one another. The adjustability of the connecting unit 15 can also be advantageous in order to be able to use the connected transport units 3 on different transport devices 1, the structural designs of which differ, in particular with regard to the distances between two opposing transport planes TEi on which the connected transport units 3 are moved.

An exemplary arrangement of drive coils 6 on a transport segment TSi is shown in FIG. 2. The transport segment TSi is arranged on the planar motor 2 in such a way that the drive coils 6 face the drive magnets 4 of the transport units 3 during operation in order to form a transport plane TEi. The transport segment TSi here has an essentially square base region, but any other shape is of course also possible. In order to allow a two-dimensional movement of the transport units 3 therein, the drive coils 6 are divided into coil groups 6a, 6b. The coil groups 6A, 6B each have a certain number of drive coils 6, the orientation of each of the drive coils 6 of the coil groups 6A, 6B being different. In the example shown, four drive coils 6 are provided for each coil group 6A, 6B and the drive coils 6 of the coil groups 6A, 6B are rotated 90 degrees with respect to one another.

Of course, other arrangements, groupings and proportions would also be possible. For example, a plurality of layers of drive coils 6 could also be provided and are arranged one above the other. For example, in the example shown, a further layer of drive coils 6 could be provided, for example under (or above) the shown drive coils 6 in the Z direction. The coil groups 6A, 6B could advantageously alternate in the Z direction. As a result, an essentially continuous moving magnetic field could be generated in the axis directions Y and X. The arrangement also allows a two-dimensional movement profile of the transport units 3 in the transport plane TEi, in this case with coordinates in X and Y. A rotation of transport units 3 about an axis normal to the transport plane TEi is also possible (in this case about the Z-axis).

The drive coils 6 are preferably designed as so-called air coils without an iron core in order to reduce the permanent magnetic force of attraction between the transport units 3 and the transport segments TSi. As a result, the transport units 3 are less strongly attracted by the drive magnets 4 in the direction of the transport plane TEi, which is particularly advantageous in the case of multi-acting transport units 3B, 3C in order to facilitate a transfer from one transport plane TEi to an adjacent transport plane TEi.

In FIG. 3A, a single-acting transport unit 3A is shown in a side view, while FIG. 3B shows the single-acting transport unit 3A in a plan view of the drive magnets 4 from below. The single-acting transport unit 3A has a base body 9 with an essentially rectangular base region. Drive magnets 4 are arranged in a known manner, on the lower face, which faces the transport plane TEi of a planar motor 2 during operation. For example, an object O to be transported can be arranged on the opposite upper face of the base body 9. Similar to the drive coils 6 on the transport segment TSi, the drive magnets 4 are also divided into magnet groups 4A, 4B. A certain number of drive magnets 4 is provided in each magnet group 4A, 4B, with alternation of drive magnets 4 of different magnetic polarity, as indicated in FIG. 4b by the hatched and non-hatched drive magnets 4. The drive magnets 4 of one magnet group 4A are oriented differently than the drive magnets 4 of the other magnet groups 4B.

In the example shown, the drive magnets 4 are at an angle of 90 degrees to one another. The magnet groups 4B are provided here for a movement of the transport unit 3A in the Y direction, the magnet groups 4A for a movement of the transport unit 3A in the X direction. Here, too, an arrangement of a plurality of layers of magnet groups 4A, 4B would be conceivable, analogously to the previously described coil groups 6A, 6B of the drive coils 6. As a result, a higher driving force can be generated and a more uniform movement and a more precise positioning of the transport unit 3A can take place. Of course, the single-acting transport unit 3A shown is only to be understood as an example, and other shapes and other arrangements of drive magnets 4 would also be conceivable. For example, a single-acting transport unit 3A having a base body 9 with a round base could be provided. The drive magnets 4 could then be arranged in a ring, magnet groups 4A, 4B preferably alternating in the circumferential direction.

In FIG. 4, a double-acting transport unit 3B is shown which has already been described with reference to FIG. 1*a-c*. The double-acting transport unit 3B has an L-shaped base body 9, on the legs 9A, 9B of which drive magnets 4 are provided. The angle between the legs 9A, 9B of course preferably corresponds to the angle of abutment α between two adjacent transport planes TEi on which the double-acting transport unit 3B is to be moved. The arrangement of the drive magnets 4 on the respective legs 9A, 9B essentially corresponds to the arrangement of the single-acting transport unit 3A from FIGS. 3A+3B. Again, a different shape of the base body 9 and/or a different arrangement of the drive magnets 4 could of course also be provided here. Because the function of a planar motor 2 is basically known in the prior art, it will not be discussed in more detail at this point.

However, a double-acting transport unit 3B does not necessarily have to have identically configured legs 9A, 9B. It would be conceivable, for example, for one of the legs 9A, 9B to be longer than the respective second leg 9A, 9B, as indicated in FIG. 4 by dashed lines. A larger number of drive magnets 4, for example twice as many, could then be provided on the extended leg 9A1, 9B1 than on the other leg 9A, 9B as a result of which, for example, a greater driving force potential is achieved. Of course, both legs 9A, 9B could also be made longer (9A1, 9B1) in order to increase the number of drive magnets 4 in each case. One leg, in this case the first leg 9A, could for example also be lengthened laterally, as is indicated by the dashed leg section 9A2 in FIG. 4. Likewise, the leg 9B could be widened analogously on the same side or, for example, additionally or alternatively on the opposite side, as is indicated by the leg section 9B2. The legs could, however, also differ in terms of the number and/or size of the drive magnets 4. It can be seen from this that there are many ways in which a multi-acting transport unit can be designed. The specific structural design is of course at the discretion of a person skilled in the art and is advantageously adapted to a particular planned application.

Another advantageous embodiment of the invention is shown in FIG. 5. The transport device 1 in FIG. 5 essentially corresponds to the one in FIG. 1C, only the relevant upper left region from FIG. 1C being shown. A double-acting transport unit 3B is arranged in the region of the adjoining transport planes TEA, TEB. The double-acting transport unit 3B differs from the one in FIG. 1*a*-1C in that the double-acting transport unit 3B can be decoupled into at least two single-acting transport units 3Ax, 3Ay. For this purpose, at least one coupling device 11 is provided on each of the at least two single-acting transport units 3Ax, 3Ay in order to releasably couple the transport units 3Ax, 3Ay to one another in order to form the multi-acting transport unit 3B.

After decoupling, the single-acting transport unit 3Ax is movable two-dimensionally in the conventional manner within the transport plane TEA of the first planar motor 2A. The other single-acting transport unit 3Ay can be moved analogously within the transport plane TEB of the second planar motor 2B. The drive and the movement control take place via the drive coils 6 of the relevant planar motor 2A, 2B. The coupling devices 11 are only indicated schematically here. The coupling devices 11 are preferably standardized and identical on each transport unit 3Ax, 3Ay in order to be able to couple any transport units 3A to one another to form a multi-acting transport unit. The coupling/decoupling can take place through the movement itself or can also take place actively, for example through corresponding actuators on the coupling devices 11. The structural design can essentially be of any desired type; for example a mechanical coupling device 11, such as a positive or non-positive fit or a magnetic coupling device 11, would be conceivable.

The transport units 3Ax, 3Ay can of course also be coupled again to form a double-acting transport unit 3B. For this purpose, the transport units 3Ax, 3Ay are moved toward one another, for example on the corresponding transport plane TEA, TEB, so that they meet in the region where the two transport planes TEA, TEB adjoin one another, as symbolized by the arrows. The coupling is preferably carried out automatically, for example when the two transport units 3Ax, 3Ay come into contact. After the coupling, the two transport units 3Ax, 3Ay can be moved together, essentially creating a transport unit assembly 3Axy which corresponds to a double-acting transport unit 3B. The possibilities for moving the coupled transport unit assembly 3Axy essentially correspond to those of the double-acting transport unit 3B described above with reference to FIG. 1*a-c*. If coupling is no longer desired or required, the coupled transport unit assembly 3Axy can be released again and each transport unit 3Ax, 3Ay can again be moved individually on the corresponding transport plane TEA, TEB.

The coupling of two transport units 3Ax, 3Ay can be advantageous compared to the previously shown double-acting transport unit 3B. On the one hand, the higher drive force potential of the double drive (via the drive coils 6 of the first and second planar motors 2A, 2B) can be used when the transport unit assembly 3Axy is moved in the longitudinal direction X along both transport planes TEA, TEB. On the other hand, the transport unit group 3Axy can be released again for movement within only one transport plane TEA, TEB. As a result, the better weight distribution of a single-acting transport unit 3A can be used, for example, during movement within the (in this case) vertical transport plane TEA, because the center of gravity is closer to the transport plane TEA than is the case with a multi-acting transport unit 3B, 3C.

The L-shaped profile of the base body 9 (in particular the legs 9B) of the double-acting transport unit 3B in FIG. 1C has a center of gravity which is further away from the transport plane TEA than the single-acting transport unit 3A in the Y-direction. If the double-acting transport unit 3B in FIG. 1C is moved upward in the vertical direction Z in the first (vertical) transport plane TEA, this leads to a higher tilting moment about the longitudinal axis X than with a single-acting transport unit 3A due to the force of gravity. In particular during acceleration processes (in this case upward in the Z direction), the tilting moment can under certain circumstances become impermissibly high, which in the worst case could lead to the double-acting transport unit 3B becoming detached from the planar motor 2A. Similarly, objects (not shown) transported with the transport units 3A-3C can also contribute in an analogous manner to a higher tilting moment due to their additional mass, which must be taken into account when designing the transport device 1 and when planning the movement of the transport units 3. Coupling single-acting transport units 3A to form a transport unit group (or essentially to form a multi-acting transport unit) is therefore advantageous, because the transport unit group can be released again for movement within only one transport plane TEi.

Of course, single or multi-acting transport units 3, each having one or more coupling devices 11, could be connected by means of a connecting unit 15 to one or more other single or multi-acting transport units 3 (with or without coupling devices 11) that are movable within another transport plane TEi. This further increases the flexibility of the transport device 1, because many different combinations are possible.

Another embodiment of a transport device 1 is shown in FIG. 6. The transport device 1 in this case has two planar motors 2F, 2G which are arranged at a distance from one another, the two transport planes TEF, TEG facing one another and parallel (arrangement angle γ=0°. However, it would also be possible for the transport planes TEF, TEG to be inclined relative to one another at an arrangement angle γ 45°, as was shown in relation to the fifth planar motor 2E', FIGS. 1C and 1B. In each of the transport planes TEF, TEG of the planar motors 2F, 2G, single-acting transport units 3A1, 3A2 are provided which can be moved two-dimensionally within the corresponding transport plane TEF, TEG. As in the examples shown above, the movement is controlled via two planar motor control units (not shown) and/or via a higher-level transport unit control unit, which controls the drive coils of the planar motors 2F, 2G in order to interact with the drive magnets 4 of the transport units 3A1, 3A2. Of course, the planar motors 2F, 2G can in turn also be constructed in a modular way from transport segments TSi. A detailed description of the mode of operation is omitted at this point.

The two transport units 3A1, 3A2 are connected by means of a connecting unit 15. The connecting unit 15 can be rigid or flexible. For example, the connecting unit 15 could have an essentially rigid rod which is connected in an articulated manner to both transport units 3A1, 3A2, as shown in FIG. 6. As already mentioned, the connecting unit 15 is preferably designed to be adjustable, so that a length of the connecting unit 15 can be changed during the movement of the transport units 3A1, 3A2. This is advantageous because the distance between the transport units 3A can change during the movement.

For example, the transport unit 3A of the first planar motor 2F can carry out the indicated movement profile BPA1 and the transport unit 3A of the second planar motor 2G can carry out the indicated movement profile BPA2. The two transport units 3A1, 3A2 would thus be moved essentially in opposite directions, thereby increasing the distance between the transport units 3A1, 3A2, as indicated by the length difference ΔL in FIG. 6. However, the distance could also be reduced, for example if the transport planes TEF, TEG are not arranged in parallel, but are instead arranged at an angle to one another. In the illustrated case of the parallel transport planes TEF, TEG, the length of the connecting unit 15 is preferably adjustable between a minimum length and a maximum length. The minimum length corresponds, for example, to the distance between directly opposing transport units 3A1, 3A2, and the maximum length corresponds to the distance between the transport units 3A1, 3A2 if they are located at diagonally opposite corner points EPF, EPG of the transport planes TEF, TEG.

Very complex movement patterns can be implemented by arrangement of a connecting unit 15. For example, by specifying certain movement profiles BPA1, BPA2 for the two transport units 3A1, 3A2, a desired resulting movement profile of a center point MP (or any other point) of the connecting unit 15 can be generated which results from overlapping the movement profiles BPA1, BPA2. For example, one or more receiving units 16 could also be provided on the connecting unit 15 in order to receive and transport one or more objects, for example a hook as shown. Because a planar motor 2 also allows the transport unit 3A to rotate about the vertical axis, a swiveling movement of a receiving unit 16 could also be carried out, for example, as indicated in FIG. 6 by the arrow on the transport unit 3A1 and the receiving unit 16 illustrated with broken lines.

For example, a second pair of transport units 3B, 3A4 with a connecting unit 15 could also be provided, it being also possible for the connecting units 15 to have a different design. The double-acting transport unit 3B and the single-acting transport unit 3A4 are connected here to a rigid carrier, for example. A certain relative movement between two connecting units 15 would thus also be possible, as a result of which the flexibility of the transport device 1 can be further increased. It would be conceivable, for example, that the receiving unit 16 of one connecting unit 15 transfers an object to a receiving unit 16 of another connecting unit 15, etc. In this way, a variety of movement sequences can be carried out with the transport device 1. For example, the transport units 3A1, 3A2 could be moved such that an object O1, which is transported on the second connecting unit 15, is received by means of the receiving unit 16 provided on the connecting unit 15. In the example shown, the receiving unit 16 is designed as a hook, and an eyelet for engaging the hook is arranged on the object O1. As mentioned, instead of the rigid carrier between the double-acting transport unit 3B and the single-acting transport unit 3A4, a separate planar motor 2, long-stator linear motor or a continuous conveyor could also be provided, for example. As a result, the movement of the two transport units 3B, 3A4 could be overlapped by one or more additional degrees of freedom of movement.

Of course, a combination with the further planar motors 2 would also be conceivable, for example by connecting the two planar motors 2F, 2G by means of a further planar motor 2H, thereby forming a (lower horizontal) transport plane TEH, which is then normal to the transport planes TEF, TEG. In the transport plane TEH, for example, a single-acting transport unit 3A3 could again be provided by means of which a further object O2 is moved that can be received by the receiving unit 16 with appropriate synchronization of the movement profiles. Of course, more than two transport units 3 can also be connected by means of one or more connecting units 15, or one or more coupling devices 11 can be provided on the transport units 3. This makes it clear that, in addition to the variants shown, many other configurations are possible. The specific selection, number and combination of planar motors 2, (single and/or multi-acting) transport units 3, coupling devices 11 and connecting units 15 is of course at the discretion of a person skilled in the art.

The invention claimed is:

1. A transport device comprising:
   at least two planar motors, each forming a transport plane in which at least one transport unit is movable two-dimensionally, drive coils on each planar motor interact electromagnetically with drive magnets of a transport unit in order to move the transport unit within a corresponding transport plane, wherein the transport planes of the at least two planar motors face one another, at least one first transport unit being provided in the transport plane of a first planar motor, which transport unit is connected by a connecting unit to at least one second transport unit provided in the transport plane of a second planar motor, wherein the connecting unit is adjustable in order to adapt a connecting unit length during the movement of the at least two transport units to a variable distance between the at least two transport units, and wherein the connecting unit is one of:
a rigid rod connected in an articulated manner to the at least one first transport unit and to the at least one second transport unit, or
a flexible element connected to the at least one first transport unit and to the at least one second transport unit.

2. The transport device according to claim 1, wherein an arrangement angle is provided between the opposing transport planes which is no greater than 45° by the transport planes being arranged opposite to one another.

3. The transport device according to claim 2, wherein the arrangement angle is 0°, whereby the transport planes arranged opposite each other are parallel to one another.

4. The transport device according to claim 1, further comprising at least one receiving unit for receiving an object on the connecting unit.

5. The transport device according to claim 1, wherein the transport planes formed by the at least two planar motors are adjacent to one another and inclined with respect to one another at an angle of abutment, and the at least one first transport unit and the at least one second transport unit are formed as at least one multi-acting transport unit, the at least one multi-acting transport unit comprising:
at least first drive magnets on the multi-acting transport unit to interact electromagnetically with the drive coils of a first planar motor, and
at least second drive magnets on the multi-acting transport unit to interact electromagnetically with the drive coils of a second planar motor, wherein the multi-acting transport unit is at least one of two-dimensionally movable within the transport plane of one of the planar motors or one-dimensionally movable in the adjacent transport planes of the first and second planar motors.

6. The transport device according to claim 5, wherein the multi-acting transport unit is a double-acting transport unit, on which a base body is provided with two legs, wherein the legs are arranged at an angle to one another that corresponds to the angle of abutment between two adjacent transport planes, and wherein the first drive magnets are arranged on one leg and the second drive magnets being arranged on the other leg.

7. The transport device according to claim 5, wherein the at least one first transport unit and the at least one second transport unit of the multi-acting transport unit are decouplable into at least two single-acting transport units, wherein each of the at least two single-acting transport units include at least one coupling device on each of the at least two single-acting transport units to releasably couple the transport units to one another in order to form the multi-acting transport unit.

8. The transport device according to claim 5, wherein the angle of abutment between the two adjacent transport planes is between 30° and 150°.

9. The transport device according to claim 8, wherein the angle of abutment is 90°.

10. The transport device according to claim 1, wherein each of the at least two planar motors comprises at least one planar motor control unit for controlling the drive coils of a relevant planar motor, wherein the planar motor control units of the at least two planar motors are at least one of:
connected to exchange control information for controlling transport units of the relevant planar motor, or
connected to a higher-level transport device control unit or are integrated therein.

11. The transport device according to claim 1, wherein at least one of the at least two planar motors is constructed from a plurality of adjacent transport segments which together form the transport plane of the planar motor, and wherein drive coils are provided on each transport segment.

12. A transport unit for a transport device having at least two planar motors with opposing transport planes, drive magnets being provided on the transport unit to interact with drive coils of a planar motor in order to move the transport unit two-dimensionally in the transport plane of the relevant planar motor, the transport unit comprising:

a connecting unit connected to at least one other transport unit, which is movable in the other transport plane of the opposing transport planes, wherein the connecting unit is one of:
a rigid rod connected in an articulated manner to the at least one first transport unit and to the at least one second transport unit, or
a flexible element connected to the at least one first transport unit and to the at least one second transport unit,
wherein the connecting unit is adjustable in order to adapt a connecting unit length to a variable distance between the at least two transport units.

13. The transport unit according to claim 12, wherein at least one transport unit is designed as a multi-acting transport unit, at least first drive magnets being provided on the multi-acting transport unit in order to interact electromagnetically with the drive coils of a first planar motor and at least second drive magnets being provided in order to interact electromagnetically with the drive coils of a second planar motor, and wherein the multi-acting transport unit is movable two-dimensionally within the transport plane of one of the planar motors or likewise is movable one-dimensionally within the adjacent transport planes of the first and second planar motors.

14. The transport unit according to claim 12, wherein at least one receiving device for receiving an object is provided on the connecting unit.

15. A method for operating a transport device having at least two planar motors with opposing transport planes, drive coils being provided on the planar motors each being controlled by a corresponding planar motor control unit, comprising:

moving at least one transport unit which is moved within the transport plane of one of the planar motors by a connecting unit that is connected to at least one other transport unit which is moving within the transport plane of the at least one other planar motor, wherein the connecting unit is adjustable in order to adapt a connecting unit length during the movement of the at least two transport units to a variable distance between the at least two transport units and wherein the connecting unit is one of:

a rigid rod connected in an articulated manner to the at least one first transport unit and to the at least one second transport unit, or a flexible element connected to the at least one first transport unit and to the at least one second transport unit; and controlling the drive coils of the planar motors being controlled by the corresponding planar motor control unit in order to interact with the drive magnets of the transport units to generate a propulsion force.

16. The method according to claim 15, wherein at least one of the at least two transport units connected by the connecting unit is coupled by a coupling device to a transport unit of the adjacent transport plane to form a double-acting transport unit in the region of adjacent transport planes inclined to one another at an angle of abutment.

\* \* \* \* \*